United States Patent [19]

Keller

[11] Patent Number: 4,760,807

[45] Date of Patent: Aug. 2, 1988

[54] HAND PRESSURE OPERATED SEED PLANTER

[75] Inventor: Paul Keller, Coon Rapids, Minn.

[73] Assignee: Keller Engineering Co. Inc, San Diego, Calif.

[21] Appl. No.: 85,738

[22] Filed: Aug. 17, 1987

[51] Int. Cl.[4] .................................................. A01C 7/02
[52] U.S. Cl. ........................................................ 111/92
[58] Field of Search .................................... 111/8-12, 111/82, 89, 92-99

[56] References Cited

U.S. PATENT DOCUMENTS

| | | | |
|---|---|---|---|
| 25,595 | 9/1859 | Wasterbarg | 111/96 X |
| 93,690 | 8/1869 | Dyson | 111/94 |
| 106,568 | 8/1870 | Dyer | 111/96 |
| 209,929 | 11/1878 | Shepard | 111/94 |
| 431,841 | 7/1890 | Davis | 111/92 |
| 774,711 | 11/1904 | Thompson | 111/95 |
| 879,339 | 2/1908 | Wabers | 111/95 |
| 1,124,523 | 1/1915 | Reeser | 111/95 X |
| 1,792,763 | 2/1931 | Ryan | 111/95 |
| 1,830,283 | 11/1931 | Madderra | 111/92 |
| 2,865,315 | 12/1958 | Goldstein | 111/92 |
| 3,331,532 | 7/1967 | Hori | 47/56 X |
| 4,206,714 | 6/1980 | Walsh | 111/92 |
| 4,244,308 | 1/1981 | Vince | 111/92 X |

Primary Examiner—James R. Feyrer
Attorney, Agent, or Firm—James V. Harmon

[57] ABSTRACT

A hand pressure operated seed planter includes an elongated vertically disposed tubular body for storing seeds with a cup-shaped telescoping bottom cap having seed dispensing openings. A rotatably mounted closure plate is mounted within the bottom cap. The bottom cap is normally forced downwardly by a spring. A spiral plate that is adapted to function as a helical cam member is operatively associated between the storage tube and the closure plate to rotate the closure plate to an open position allowing seeds to fall through the dispensing hole when enough downward pressure is applied to the planter to force the bottom cap upwardly upon the tubular body.

7 Claims, 1 Drawing Sheet

U.S. Patent  Aug. 2, 1988  4,760,807
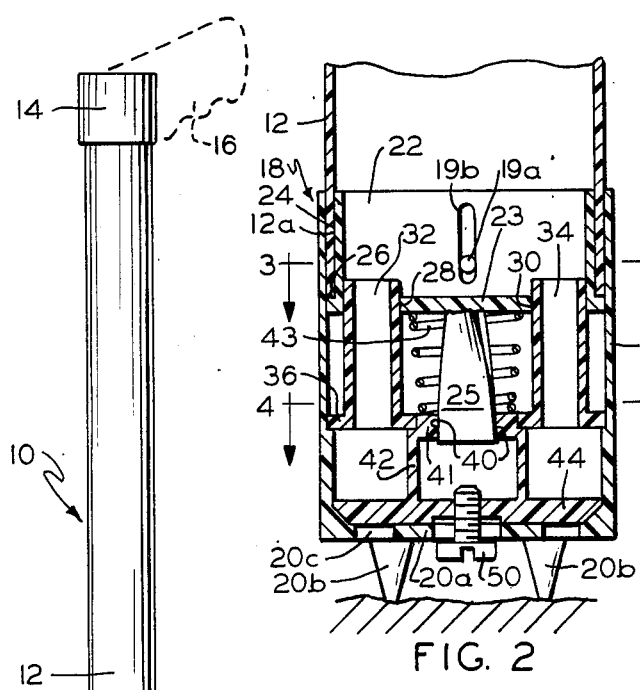
FIG. 2
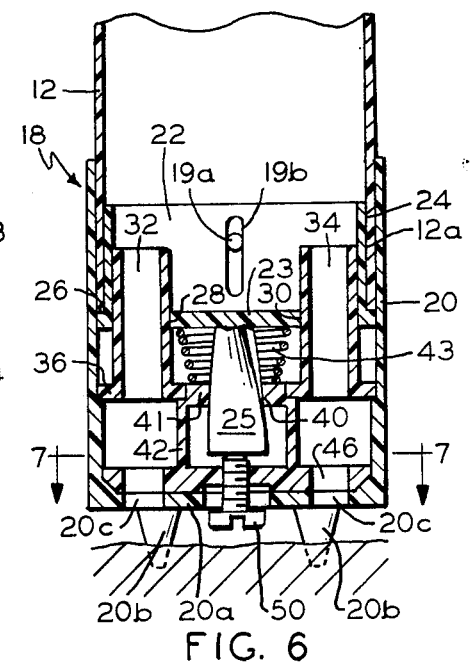
FIG. 6
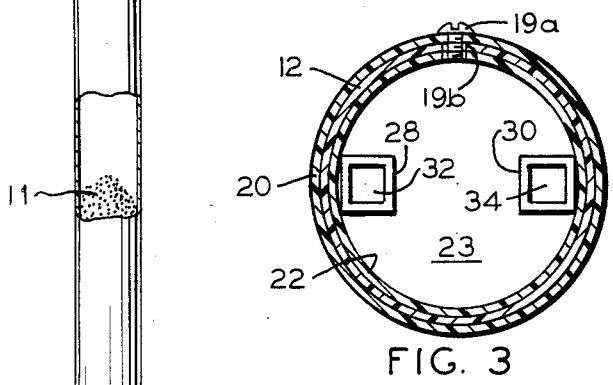
FIG. 3  FIG. 4
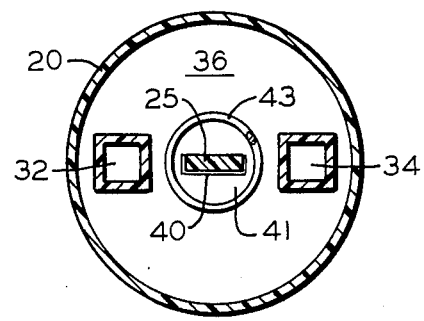
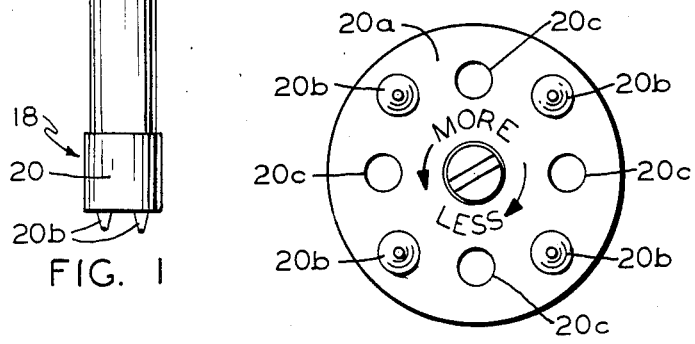
FIG. 1  FIG. 5
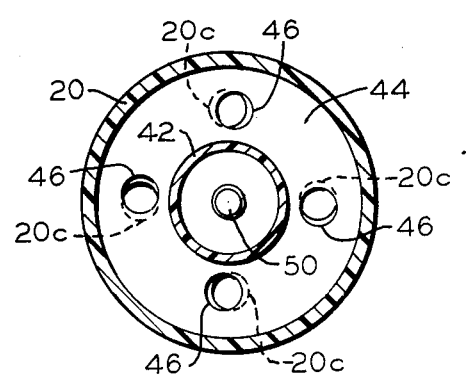
FIG. 7
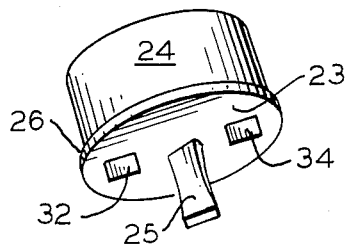
FIG. 8
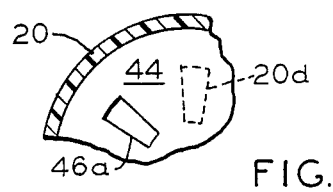
FIG. 9

HAND PRESSURE OPERATED SEED PLANTER

BACKGROUND OF THE INVENTION

While hand planters have been used over the years for planting crops such as corn, no entirely satisfactory seed planter has been available for conveniently planting a variety of seeds such as vegetable or grass seed precisely where needed with a minimum of physical effort while at the same time being mechanically simple, rugged in construction, inexpensive to manufacture and reliable in operation.

To be in demand by the homeowner, the planter should cost only a few dollars to make, should be suited for use with a variety of seeds, e.g., in regard to planting grass seed to restore bare spots in a lawn where heretofore the person doing the planting sometimes had to get down on his knees to place the seeds where they were needed. This is also true of planting rows of vegetable seeds in a garden. To accurately place the seeds one must crouch close to the ground. If a large lawn contains several areas that require reseeding, one may have to get up and down several times to place the seeds accurately. This is especially a problem for older people.

In view of these and other shortcomings of the prior art it is an objective of the invention to provide an improved seed planter which allows the planting of a variety of seeds from a standing position through the use of a strong, inexpensive, simple mechanism that produces depressions in the ground to receive the seeds while at the same time planting a predetermined quantity of seeds in a precise location.

A further object is to adjust the amount of seeds dispensed as required.

The invention will be better understood by reference to the following figures which illustrate the invention by way of example.

THE FIGURES

FIG. 1 is a side elevational view of a planter in accordance with the invention.

FIG. 2 is an enlarged vertical sectional view of the lower end of the planter of FIG. 1 with the planter closed so that no seeds are dispensed.

FIG. 3 is a horizontal sectional view taken on line 3—3 of FIG. 2.

FIG. 4 is a horizontal sectional view taken on line 4—4 of FIG. 2.

FIG. 5 is a bottom view of the planter.

FIG. 6 is a vertical sectional view similar to FIG. 2 showing the planter open with seeds being dispensed.

FIG. 7 is a horizontal sectional view taken on line 7—7 of FIG. 6 with dispensing apertures almost fully opened.

FIG. 8 is a perspective view of the spiral cam plate and associated structure and FIG. 9 is a partial view of a modified form of the device with different shaped dispensing apertures.

SUMMARY OF THE INVENTION

The invention provides a hand pressure operated seed planter including a vertically disposed normally upright planter body having a seed storage compartment inside. The planter has a bottom wall with at least one seed dispensing hole therein. A moveable seed closure gate is positioned adjacent the dispensing hole. A handle is provided on the planter for applying downward pressure by hand and an actuating member such as a rotation imparting helix is operatively associated between the handle and the gate to move the gate in the proper direction when the handle is pressed downwardly to remove the gate from the hole and allow seeds to be dispensed onto the ground through the dispensing hole.

More specifically, the planter preferably includes an elongated upright seed storage tube having an elongated seed storage compartment therein which extends into the vicinity of the lower end of the planter so that substantially the entire length of the planter serves as a seed storage compartment to store seeds throughout almost the entire length of the planter body. The handle is affixed to the top of the tubular planter body so that pressure can be applied by hand to the tube. A dispensing member or cap at the bottom of the tube is moveably related to the tube for movement along the axis of the tube so that it will slide upwardly on the tube when the handle is pressed downwardly. The dispensing member has at least one dispensing hole in it. A seed releasing closure which is operatively associated with the hole normally covers the hole to prevent seeds from falling out. Means is operatively associated between the closure and the planter tube for moving the closure away from the dispensing hole when hand pressure exerted on the storage tube presses the dispensing member against the ground thereby allowing seeds to fall through the hole. It is preferred that pegs or cleats extend downwardly from the planter to act as dibbles for the purpose of producing depressions in the ground to receive the seeds.

DESCRIPTION OF A PREFERRED EMBODIMENT

Shown in the figures is a hand pressure operated seed planter 10 comprising an elongated planter body in the form of an upright tube 12 which is hollow from top to bottom and contains seed 11 such as grass seed. The tube 12 can be formed, for exampled, from injection molded or extruded plastic tubing. The upper end of the tube 12 comprises a handhold or handgrip which in this case is a cover or cap 14 used to seal the upper end of the tube 12 after the seed has been introduced. The cap 14 can be provided with a handgrip 16 if desired to provide a more comfortable handhold.

At the bottom of the planter is provided a ground engaging base portion in the form of a bottom cap 18 having a cup shaped configuration with a cylindrical side wall 20 and bottom wall 20a having integral downwardly extending cleats or pegs 20b that serve as dibbles for the purpose of making holes in the soil to receive the seeds. Four such vertically disposed circumferentially spaced apart pegs 20b are provided only two of which are shown in FIGS. 2 and 6. The bottom cap 18 is telescopically mounted over the lower end of the tube 12 for sliding motion along the axis of the tube, i.e., vertically as seen in FIGS. 1, 2 and 6 and is provided with an upwardly facing internal shoulder 21 to receive a circular seed transfer plate 36 having a pair of laterally spaced apart vertically disposed parallel seed transfer ports or passages 32 and 34 each of which is rectangular in cross section. The seed transfer plate 36 is fastened in a fixed position within the bottom cap 20 on the shoulder 21 preferably by bonding it in place with a suitable adhesive.

Affixed within the bottom end of the tube 12 inside the cap 18 is a cup shaped cam support 22 having a circular bottom wall 23 that extends across the bottom of the tube 12 to seal its lower end. The cam support 22 is provided with an external circular shoulder of just the proper size to rest against the lower end of the tube 12 and is preferably bonded therein, e.g., by adhesive so that during use it remains secured at all times to the tube 12. The cap 18 is held on the tube 12 by a screw 19a extending through vertical slots 19b in cam support 22 and tube 12.

Extending downwardly from the center of the circular wall portion 23 is a vertically disposed somewhat elongated spiral plate 25 which functions as a helical cam and in the embodiment shown is integral with the cam support 22. The cam makes a 90° spiral turn throughout its full length. During operation the plate 25 functions as a spiral or helical cam surface.

Operatively associated with the lower end of the spiral plate 25 is a seed releasing closure member or gate 41 having a rectangular slot 40 of just the proper size to fit over and slide easily along the length of the spiral plate 25 as it moves up and down during operation. The seed dispensing member 41 is mounted for rotation within the cap 20 for rotational movement about a central vertical axis and includes a centrally located upwardly projecting cylindrical hub 42 closed at its upper end by means of an end plate 41a (FIG. 4) in which the slot 40 is located. At the lower end of hub 42 is a horizontally disposed seed dispensing member in the form of a disc 44 of the proper size to rotate easily within the bottom cap 18. The disc 44 is provided with at least one and this case four circumferentially spaced apart vertically disposed seed dispensing openings 46 that are aligned at times with cooperating openings 20d in the lower wall 20a of the bottom cap 18 allowing seeds to fall on the ground.

As shown in FIGS. 2, 3 and 6 the ducts 32 and 34 are slidably mounted within laterally spaced openings 28 and 30 in the bottom cam support 22 so that during operation they slide easily up and down within the openings (compare FIGS. 2 and 6) while carrying seed down to the closure member 41. Between the plate 23 and the closure member 41 is a helical compression spring 43 which forces the bottom cap 18 downwardly to a resting or normal position shown in FIG. 2.

Threaded through the center of the bottom cap 20 is an adjustment screw 50 the upper end of which is adapted to serve as a stop for limiting the downward motion of the plate 25 and the angular rotation of the seed dispensing disc 44. It can be seen in FIG. 2 that by turning the screw 50 in a clockwise direction as viewed from below, the screw will be further elevated. This will reduce the downward movement of the spiral plate 25 and in turn reduce the angular rotation of the dispensing plate 41. This prevents the holes 46 from opening holes 20d as far so that a smaller amount of seed is dispensed. In this way by turning screw 50, either more or less seed can be dispensed with each up and down movement of the planter 10.

While the dispensing openings 46 and 20d have been shown as circular in FIGS. 5 and 7 other shapes can be used such as rectangular or elongated shaped openings 20d and 46a as shown in FIG. 9. Other possible shapes will be apparent to those skilled in the art. The size and shape of the openings will of course be selected to best suit the type of seed being dispensed.

Thus the present invention provides a handheld planter 10 which comprises a vertical elongated planter body 12 with a handhold in this case a cap 14 at the upper end adapted to be grasped and held in the hand during operation while the user is in a standing position.

A seed storage chamber is provided in the planter for holding seeds. This chamber preferably comprises the entire inside volume of the tube 12. The bottom wall 20a of the planter is adapted to be pressed against the ground. Seed dispensing holes 20d are provided to communicate with the seed storage chamber when pressure is applied to the top of the planter forcing the cup 18 upwardly on the tube 12. This in turn forces the plate 25 downwardly through the rotatable closure 41 so as to move the openings 46 therein into alignment or almost into alignment with the openings 20d in the bottom wall 20a. When pressure is released, the spring 43 will force the bottom cap 18 downwardly into the position of FIG. 2 which will in turn close the seed dispensing openings 20d.

The planter is used by pressing it up and down repeatedly in the area where the seeds are to be planted as the cleats 20b produce openings in the soil to receive seeds. The quantity of seeds dispensed with each up and down movement of the planter is controlled as described above by changing the position of the screw 50.

Many variations within the scope of the appended claims will be apparent to those skilled in the art once the principles described above are understood.

What is claimed is:

1. A hand pressure operated seed planter including a planter body,
    said planter is a long narrow tube having a seed storage compartment and a seed dispensing member at the bottom of the body, said member having a bottom wall with a plurality of circumferentially spaced seed dispensing holes therein,
    a moveable seed dispensing closure member positioned adjacent the seed dispensing hole to cover the holes,
    said planter having a portion to be grasped in the hand to define a handle adapted to be pressed downwardly during operation to press the seed dispensing member against the ground,
    rotation imparting means mounted for reciprocation within the planter along an axis thereof, said means being operatively associated between the handle and the closure member to actuate the closure when the handle is pressed downwardly by moving the closure member so as to open the holes in the bottom wall of the planter thereby allowing seeds to be dispensed on the ground from the storage compartment,
    a plurality of vertically disposed circumferentially spaced apart downwardly projecting cleats on the bottom wall of the dispensing member, said cleats being spaced apart from each other, said circumferentially spaced apart seed dispensing holes and the cleats being circumferentially alternately interrelated around the periphery of the dispensing member whereby each of the cleats is adjacent one of the dispensing holes for producing a plurality of recesses in the ground to receive the seeds dispensed from each of the adjacent seed dispensing holes when the planter is used.

2. A hand planter comprising a vertical elongated planter body having a portion at the top thereof adapted to be grasped and held in the hand,
    a seed storage chamber therein for holding seeds that are to be dispensed, said planter having a bottom wall adapted to be pressed against the ground, said planter having a non-rotating dispensing member with at least one seed dispensing hole therein communicating at times with the seed storage chamber, a seed dispensing closure member mounted within the planter above the hole in the dispensing member to open and close the hole, a compression spring is operatively associated between the dispensing member and the tube for normally yieldably biasing the dispensing member in a downward direction relative to the tube, a vertically disposed spiral element adapted to function as a helical cam member operatively associated between at least the handle of the planter and the closure member, said closure member having a cam follower surface engaged upon the spiral element whereby downward pressure upon the handle forces the spiral element downwardly relative to the closure member thereby imparting rotation to the closure member adapted to move the closure to an open position allowing seeds stored within the planter to be dispensed through the dispensing hole, a seed transfer plate is mounted horizontally within the dispensing member above the closure, a cam supporting plate is connected to the bottom of the tube and at least one seed transfer duct extends from the seed transfer plate through the cam support plate into the tube above the cam support plate to convey seeds to the dispensing hole in the dispensing member, and a selectively positionable stop member is provided in the dispensing cap to control the amount of motion of the cap on the tube and to thereby regulate the amount of seed dispensed.

3. The apparatus of claim 1 wherein a plurality of vertically disposed circumferentially spaced part downwardly projecting cleats are provided on a bottom wall of the dispensing member to product holes in the ground to receive seeds dispensed from said hole when the planter is used.

4. A hand pressure operated seed planter comprising an elongated upright seed storage tube having an elongated seed storage compartment therein and extending therethrough to the vicinity of a lower end thereof to store seeds throughout substantially the length of the tube, at least a portion of the top of the planter being adapted to be grasped by the hand and defining a handle to apply downward pressure bodily to the tube, a telescoping seed dispensing member at the bottom of the tube slidably related thereto for movement with respect to the tube along the axis of the tube and adapted to slide upwardly on the tube when the handle is forced downwardly so as to press the dispensing member against the soil, said planter having at least one seed dispensing hole therein, a seed releasing closure movably mounted with respect to the planter and operatively associated with the hole to normally cover the hole to prevent the seeds from falling out, cam means operatively associated between the closure and the tube for moving the closure away from a hole covering position when hand pressure is exerted on the storage tube to press the dispensing member against the ground whereby the hole is opened and seed is allowed to fall through the hole onto the ground, the closure member is mounted for rotation upon a vertical axis and said cam means comprises a spiral element to serve as a helical cam member and said closure includes a slot adapted to fit over the spiral element, said spiral element being affixed to the tube whereby the downward movement of the tube forces the spiral element downwardly thereby imparting rotational movement to the closure sufficient to at least partly open the dispensing opening, and a screw is threaded through the dispensing member and positioned to extend upwardly into proximity to the spiral element, said screw having an upper free end adapted to contact the spiral element when the tube is pressed so by turning the screw in or out, the rotational movement of the closure is controlled to regulate the amount that each such hole is opened to thereby determine the quantity of seed dispensed.

5. The apparatus of claim 4 wherein the handle comprises a portion of the body of the planter, the seed dispensing member is a bottom cap telescopically mounted on the bottom of the planter and said seed dispensing opening is located in the bottom wall of the cap.

6. The apparatus of claim 4 wherein the dispensing member includes a plurality of spaced apart downwardly projecting cleats to serve as dibbers for producing holes in the ground to receive the seeds.

7. The apparatus of claim 4 wherein a spring is mounted between the tubular body of the planter and the dispensing member to force the dispensing member downwardly with respect to the tube.

* * * * *